US012633618B2

(12) United States Patent
Lim et al.

(10) Patent No.: US 12,633,618 B2
(45) Date of Patent: May 19, 2026

(54) VENTING DEVICE AND BATTERY MODULE INCLUDING THE SAME

(71) Applicant: LG ENERGY SOLUTION, LTD., Seoul (KR)

(72) Inventors: Sung Chul Lim, Daejeon (KR); Sang Seung Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 641 days.

(21) Appl. No.: 18/018,125

(22) PCT Filed: Jun. 24, 2022

(86) PCT No.: PCT/KR2022/009045
§ 371 (c)(1),
(2) Date: Jan. 26, 2023

(87) PCT Pub. No.: WO2023/287056
PCT Pub. Date: Jan. 19, 2023

(65) Prior Publication Data
US 2023/0268611 A1      Aug. 24, 2023

(30) Foreign Application Priority Data
Jul. 14, 2021     (KR) ........................ 10-2021-0092129

(51) Int. Cl.
*H01M 50/375*          (2021.01)
*H01M 10/48*           (2006.01)
(52) U.S. Cl.
CPC ......... *H01M 50/375* (2021.01); *H01M 10/48* (2013.01)

(58) Field of Classification Search
CPC ............................ H01M 50/375; H01M 10/48
See application file for complete search history.

(56) References Cited

U.S. PATENT DOCUMENTS

2006/0073375 A1     4/2006  Hong et al.
2012/0156533 A1*    6/2012  Cho ..................... F16K 17/0413
                                                                    251/324
(Continued)

FOREIGN PATENT DOCUMENTS

CN            1747198 A        3/2006
CN            2872043 Y        2/2007
(Continued)

OTHER PUBLICATIONS

English Translation of KR 20190002992 A (Year: 2019).*
(Continued)

*Primary Examiner* — Jeffrey T Barton
*Assistant Examiner* — Anna E. Gould
(74) *Attorney, Agent, or Firm* — Birch, Stewart, Kolasch & Birch, LLP

(57)                    ABSTRACT
A vent includes a gas inlet configured to allow gas to be introduced therethrough, a gas outlet configured to allow the gas introduced through the gas inlet to be discharged to the outside therethrough, an alarm means provided at one side of the gas outlet, the alarm means being configured to generate sound when the gas is discharged to the outside, a connection portion configured to connect the gas inlet and the gas outlet to each other, and a sealing cap located in the connection portion, the sealing cap being configured to automatically discharge gas to the outside, whereby gas generated in a battery cell or a battery module is automatically discharged to the outside.

14 Claims, 2 Drawing Sheets

100

140

150      120

110

130
141

(a)

(b)

(56)                References Cited

U.S. PATENT DOCUMENTS

| | | | |
|---|---|---|---|
| 2013/0071706 A1 | 3/2013 | Lee | |
| 2020/0259146 A1* | 8/2020 | Kim | F16K 17/0406 |
| 2021/0013472 A1* | 1/2021 | Myung | H01M 10/425 |
| 2021/0210813 A1* | 7/2021 | Sun | H01M 50/159 |
| 2023/0088261 A1 | 3/2023 | Myung | |
| 2024/0380068 A1 | 11/2024 | Oh et al. | |

FOREIGN PATENT DOCUMENTS

| | | | | | |
|---|---|---|---|---|---|
| CN | 102563148 A | 7/2012 | | | |
| CN | 203131137 U | 8/2013 | | | |
| CN | 104505482 A | 4/2015 | | | |
| CN | 208788085 U | 12/2017 | | | |
| CN | 117337514 A | 1/2024 | | | |
| JP | 10-184373 A | 7/1998 | | | |
| JP | 10-334875 A | 12/1998 | | | |
| JP | 2000-22818 A | 8/2000 | | | |
| JP | 2006-40626 A | 2/2006 | | | |
| JP | 2019-53934 A | 4/2019 | | | |
| JP | 2021-12761 A | 2/2021 | | | |
| JP | 2021-516435 A | 7/2021 | | | |
| KR | 10-2020-0059753 A | 5/2010 | | | |
| KR | 10-2012-0069104 A | 6/2012 | | | |
| KR | 10-2013-0038499 A | 4/2013 | | | |
| KR | 10-1282473 B1 | 7/2013 | | | |
| KR | 10-2016-0109513 A | 9/2016 | | | |
| KR | 10-2017-0051067 A | 5/2017 | | | |
| KR | 10-2019-0002992 A | 1/2019 | | | |
| KR | 20190002992 A | * | 1/2019 | ........... | H01M 2/348 |
| KR | 10-2252357 B1 | 5/2021 | | | |
| WO | WO-2018228740 A1 | * | 12/2018 | ......... | F16K 17/0466 |
| WO | WO 2022/285423 A1 | 12/2022 | | | |

OTHER PUBLICATIONS

English Translation of WO 2018228740 A1 (Year: 2018).*
GDG "Silicone Heat Shrink Tubing" (Year: 2025).*
Partial Supplementary European Search Report for European Application No. 22842318.2, dated Jun. 6, 2024.
International Search Report (PCT/ISA/210) issued in PCT/KR2022/009045, dated Oct. 5, 2022.

* cited by examiner

【FIG. 1】
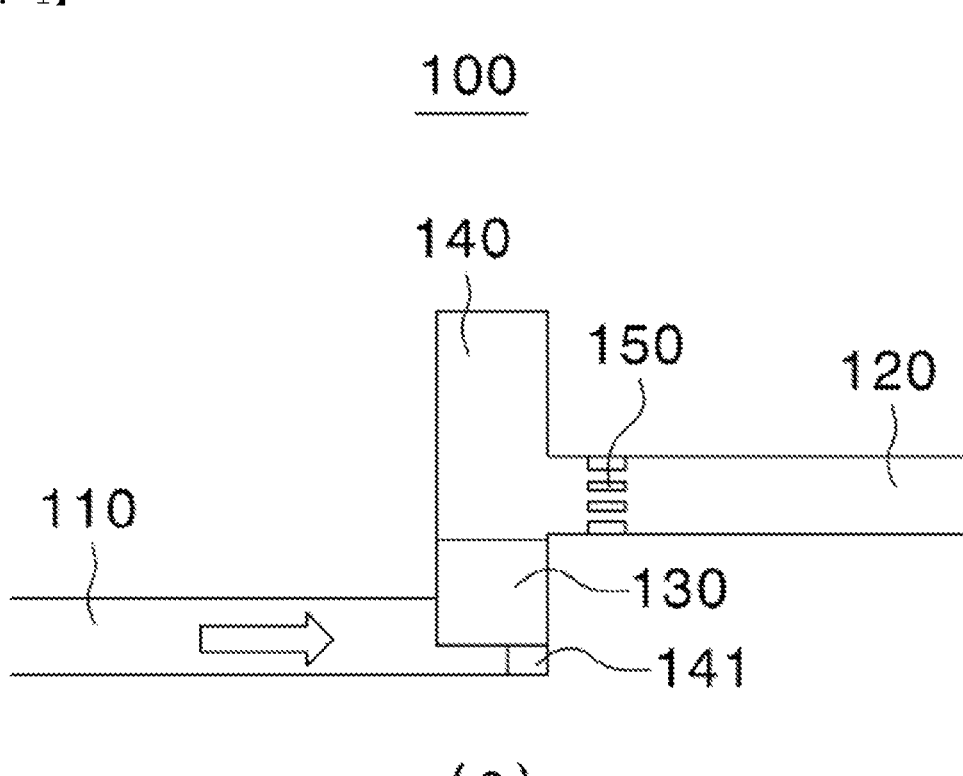
(a)
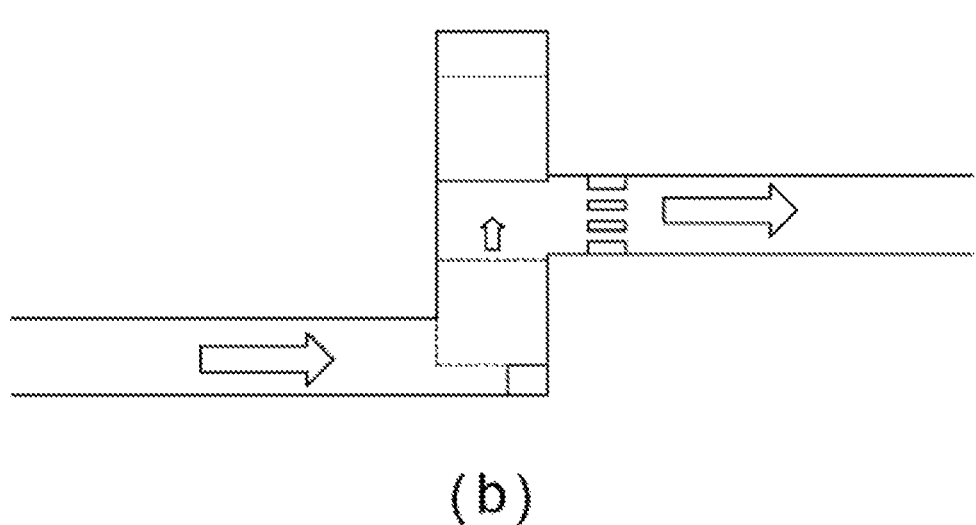
(b)

[FIG. 2]
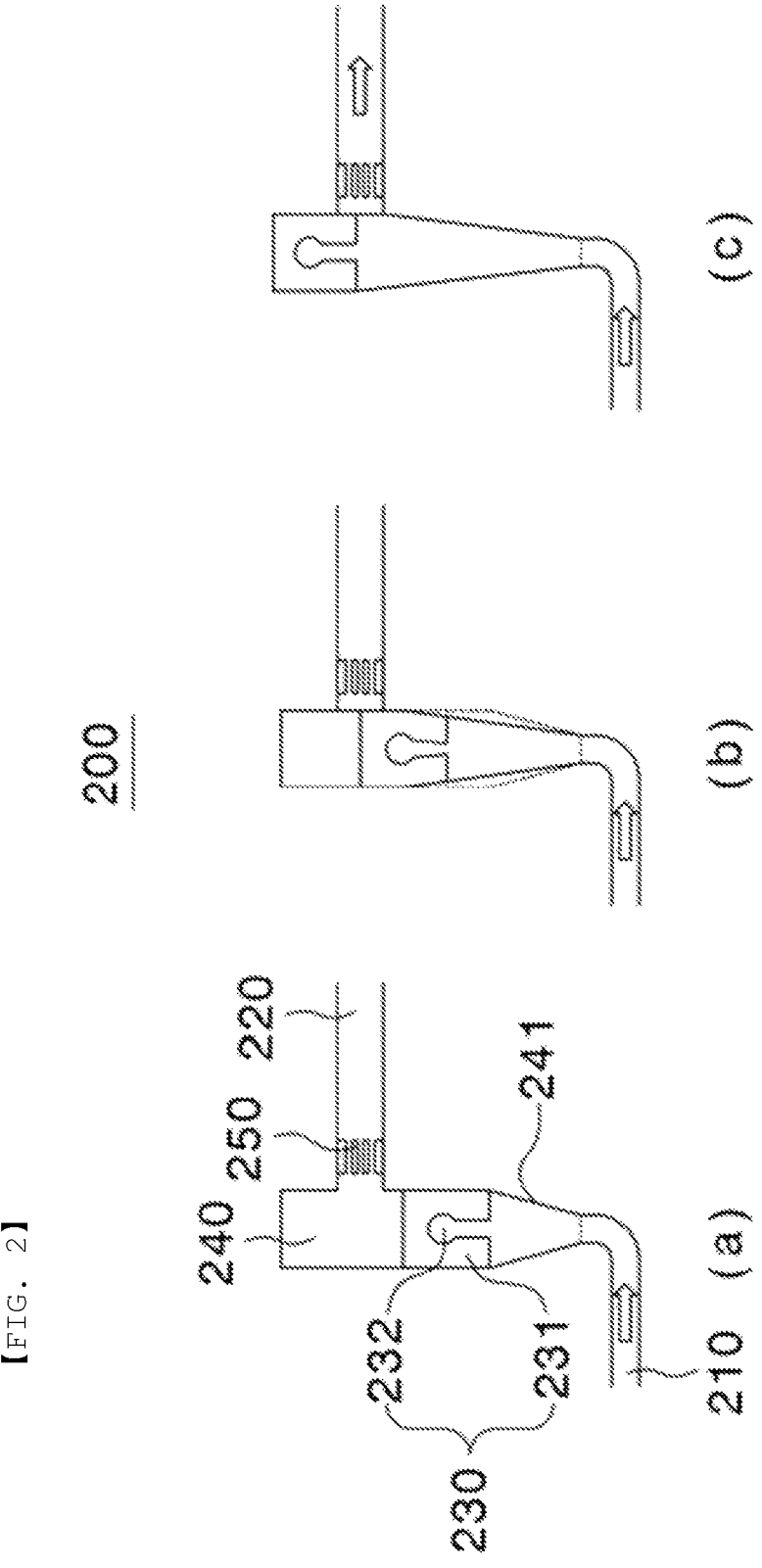

VENTING DEVICE AND BATTERY MODULE INCLUDING THE SAME

TECHNICAL FIELD

This application claims the benefit of priority to Korean Patent Application No. 2021-0092129 filed on Jul. 14, 2021, the disclosure of which is incorporated herein by reference in its entirety.

The present invention relates to a venting device capable of automatically discharging gas generated in a battery cell to the outside and a battery module including the same.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. When output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

During use of the battery pack, gas may be generated from the battery cell. Gas may be generated due to exposure to high temperature, internal short circuit, overcharging, or reaction between an electrolyte and an electrode active material caused by repeated charging and discharging.

If the pressure or temperature in the battery cell is increased due to such generation of gas, problems, such as damage to a battery case, internal short circuit, explosion, and fire outbreak, may occur.

In order to prevent these problems, the battery cell may be provided with a structure capable of discharging gas, or a battery module or a battery pack including the battery cell may be provided with a venting device.

In most conventional venting devices, however, emphasis is placed only on discharging of internal gas, and therefore a device capable of rapidly checking whether gas is generated and at the same time automatically discharging the generated gas is required.

DISCLOSURE

Technical Problem

The present invention has been made in view of the above problems, and it is an object of the present invention to provide a venting device capable of automatically discharging gas depending on internal gas pressure or internal temperature and having an alarm means configured to inform thereof and a battery module including the same.

Technical Solution

A venting device according to the present invention to accomplish the above object is a venting device configured to discharge gas in the battery cell or the battery module to an outside, the venting device including a gas inlet configured to allow gas in the battery cell or the battery module to be introduced therethrough, a gas outlet configured to allow the gas introduced through the gas inlet to be discharged to the outside therethrough, an alarm provided at one side of the gas outlet, the alarm being configured to generate a sound when the gas is discharged to the outside, a connection portion configured to connect the gas inlet and the gas outlet to each other, and a sealing cap located in the connection portion, the sealing cap being configured to move to discharge gas to the outside, wherein the sealing cap blocks connection between the gas inlet and the gas outlet, thereby blocking discharge of gas and introduction of external air, in a normal state, and moves in the connection portion under a predetermined condition such that the gas inlet and the gas outlet are connected to each other.

Also, in the venting device according to the present invention, when the pressure of gas in the battery cell or the battery module is increased to a predetermined level or higher, the sealing cap may move in the connection portion such that the gas inlet and the gas outlet are connected to each other.

Also, in the venting device according to the present invention, when the internal temperature is increased to a predetermined level or higher, the sealing cap may move in the connection portion such that the gas inlet and the gas outlet are connected to each other.

Also, in the venting device according to the present invention, the connection portion may be made of a heat shrink tube configured to shrink at a predetermined temperature or higher.

Also, in the venting device according to the present invention, the heat shrink tube may be formed from polyethylene (PE) and polypropylene (PP).

Also, in the venting device according to the present invention, the heat shrink tube may be formed from silicone.

Also, in the venting device according to the present invention, the heat shrink tube may be formed from polyethylene terephthalate (PET).

Also, in the venting device according to the present invention, the sealing cap may include a main body portion and a recessed portion formed at one side of the main body portion such that a part of the main body portion shrinks when the heat shrink tube shrinks.

Also, in the venting device according to the present invention, a lower part of the heat shrink tube may thermally shrink at the lower temperature than an upper part of the heat shrink tube.

In addition, a battery cell according to the present invention has the venting device according to the present invention.

In addition, a battery module according to the present invention has the venting device according to the present invention.

The connection portion may have a lower portion having a decreasing width and an upper portion having a constant width, and the sealing cap may have a constant width.

The gas inlet may connect to the connection portion at a first point, the gas outlet may connect to the connection portion at a second point, and a bottom surface of the sealing cap may rise above the second point so that the gas inlet and the gas outlet are connected to each other.

A protrusion may space a lower surface of the sealing cap and a bottom surface of the connection portion apart from each other.

Advantageous Effects

A venting device according to the present invention has an advantage in that a sealing cap configured to be automatically opened and closed depending on gas pressure is provided, whereby it is possible to automatically discharge gas in a battery cell or a battery module when the pressure of the gas is equal to or greater than a predetermined level and to block the introduction of air from the outside when the pressure of the gas is less than the predetermined level.

In addition, the venting device according to the present invention has an advantage in that a sealing cap configured to be automatically opened and closed depending on temperature is provided, whereby it is possible to automatically discharge gas when the temperature in the battery cell or the battery module is equal to or greater than a predetermined level and to block the introduction of air from the outside when the temperature is less than the predetermined level.

In addition, the venting device according to the present invention has an advantage in that an alarm means is provided, whereby it is possible to check gas discharge in real time.

In addition, the venting device according to the present invention has an advantage in that the venting device is applied to the battery cell or the battery module, whereby it is possible to reduce a danger of explosion or damage due to an increase in internal gas pressure.

DESCRIPTION OF DRAWINGS

FIG. 1 is a sectional view schematically showing a venting device according to an embodiment of the present invention.

FIG. 2 is a view schematically showing a venting device according to another embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a venting device according to the present invention will be described with reference to the accompanying drawings.

FIG. 1 is a sectional view schematically showing a venting device according to an embodiment of the present invention.

When describing the venting device 100 according to the present invention with reference to FIG. 1, the venting device 100 includes a gas inlet 110, a gas outlet 120, a sealing cap 130, a connection portion 140, and an alarm means 150.

The gas inlet 110 is a part that has one side coupled to a battery cell or a battery module and serves as a path through which gas is introduced into the venting device 100 from the interior thereof, and the gas outlet 120 is a part that serves as a path through which the gas introduced from the gas inlet 110 is discharged to the outside of the venting device 100. Each of the gas inlet and the gas outlet may generally be configured in the form of a pipe. However, the present invention is not limited thereto, and various forms capable of introducing and discharging gas may be employed.

In addition, the connection portion 140 is provided between the gas inlet 110 and the gas outlet 120 so as to connect the gas inlet and the gas outlet to each other, and a protrusion 141 configured to space a lower surface of the sealing cap 130 and a bottom surface of the connection portion 140 apart from each other is provided at a lower end of the connection portion 140.

When describing the positions of the gas inlet 110 and the gas outlet 120 attached to the connection portion 140, the gas inlet 110 is located at a lower end of the connection portion 140 while the gas outlet 120 is located at about a middle part of the connection portion 140 in a direction opposite the gas inlet 110, as shown in FIG. 1.

Of course, depending on circumstances, the gas outlet 120 may be provided at various positions, such as a direction perpendicular to the gas inlet 110, not the direction opposite the gas inlet 110.

In the connection portion 140, the sealing cap 130 movable in the connection portion 140 is located. In a normal state, i.e. when the pressure of gas in the battery cell or the battery module is similar to external air pressure, the sealing cap 130 is located at the lower end of the connection portion 140 to block the flow of gas between the gas inlet 110 and the gas outlet 120, as shown in (a) of FIG. 1.

When gas is generated in the battery cell and thus gas pressure in the battery cell or the battery module is increased, however, the sealing cap 130 is raised in the connection portion 140 by the internal gas pressure, as shown in (b) of FIG. 1. When the sealing cap is raised higher than the coupling portion with the gas outlet 120, gas introduced from the gas inlet 110 may be discharged to the gas outlet 120 through the connection portion 140.

Afterwards, when the internal gas pressure is lowered due to discharge of the gas, the sealing cap 130 is lowered to the lower end of the connection portion 140 to block the discharge of gas and the introduction of air from the outside.

The material for each of the gas inlet 110, the gas outlet 120, the sealing cap 130, and the connection portion 140 of the venting device 100 may be appropriately selected from among plastics and metals that exhibit high shapeability and heat resistance.

In addition, the alarm means 150, which generates sound at the time of gas discharge to inform of the gas discharge, is provided at the gas outlet 120.

Various known devices that generate sound when gas flows may be used as the alarm means 150, and the alarm means may be appropriately located in the gas outlet 120.

Meanwhile, FIG. 2 is a view schematically showing a venting device according to another embodiment of the present invention.

When describing the venting device 200 different in shape and operating mechanism from the venting device 100 described above with reference to FIG. 2, the venting device 200 includes a gas inlet 210, a gas outlet 220, a sealing cap 230, a connection portion 240, and an alarm means 250.

Here, the functions and positions of the gas inlet 210 and the gas outlet 220 are similar to those of the venting device 100 of FIG. 1, and therefore a separate description thereof will be omitted.

The connection portion 240 has a pipe form configured such that a lower part of the pipe, which is a part connected to the gas inlet 210, is narrow, and the pipe is gradually widened upwards, whereby the pipe has a trapezoidal section, and thereafter the pipe has a constant width.

In addition, the connection portion 240 is made of a heat shrink tube 241 configured to shrink at a predetermined temperature or higher.

The heat shrink tube 241, which is a tube having characteristics in which the tub shrinks at a predetermined temperature or higher, may be made of various polymer materials, which may be appropriately combined or selected to set the shrink temperature to a desired range.

As the material used in the heat shrink tube 241, various materials, such as polyethylene (PE), polypropylene (PP), polyethylene terephthalate (PET), polyvinylidene fluoride (PVDF), polyvinylchloride (PVC), polytetrafluorethylene (PTFE), and silicone, may be used alone or in a mixed state.

It is preferable for the heat shrink tube 241 according to the present invention to be formed including a mixture of polyethylene (PE) and polypropylene (PP), silicone, or PET in consideration of the shrink temperature thereof, etc.

Also, it is preferable for the heat shrink tube 241 to be made of a material that shrinks at the lowest temperature at the entirety of the connection portion 240 at a part close to the gas inlet 210 and a material that shrinks at a higher temperature with an increase in distance from the gas inlet 210.

Meanwhile, the sealing cap 230 is located in the connection portion 240 made of the heat shrink tube 241.

The sealing cap 230 includes a main body portion 231 and a recessed portion 232 formed in a lower surface of the main body portion 231, and it is preferable for the sealing cap to be made of a heat resistant material that does not shrink even at the temperature at which the heat shrink tube 241 shrinks.

It is preferable for the sealing cap 230 to have a size corresponding to the inner diameter of the connection portion 240 such that the sealing cap is located at a uniform width part of the connection portion 240 to block the flow of gas between the gas inlet 210 and the gas outlet 220.

In addition, the alarm means 250, which is capable of informing of gas discharge using sound, is attached to the gas outlet 220.

When describing the operating mechanism of the venting device 200 having the above construction with reference to FIG. 2, (a) of FIG. 2 shows a normal state in which internal temperature is lower than the shrink temperature of the heat shrink tube 241.

In the normal state, the sealing cap 230 in the connection portion 240 is located immediately above the narrow part of the connection portion 240 to block the flow of gas between the gas inlet 210 and the gas outlet 220.

When the temperature in the battery cell or the battery module is increased due to generation of gas, however, the heat shrink tube 241 made of the lowest shrink temperature material starts to shrink from a lower side thereof, as shown in (b) of FIG. 2. As a result, a part of the lower surface of the sealing cap 230, in which the recessed portion 232 is formed, shrinks and is pushed upwards to an upper side of the connection portion 240.

When this process is continuously performed, the sealing cap 230 is raised to an upper end of the connection portion 240, as shown in (c) of FIG. 2. As a result, the gas inlet 210 and the gas outlet 220 are connected to each other, whereby gas is discharged.

When the internal temperature is lowered as the result of gas discharge, the heat shrink tube 241 is relaxed to the original shape thereof. As a result, the sealing cap 230 moves downwards to block the flow of air, as shown in (a) of FIG. 2.

As described above, the venting device 100 or 200 according to the present invention blocks the introduction of air from the outside in a normal state and automatically discharges internal gas under a predetermined condition, whereby an effect of preventing explosion, fire outbreak, etc. due to the generation of gas may be achieved, and gas discharge may be checked through sound using the alarm means 150 or 250.

The venting device 100 or 200 may be attached to various battery products, such as a battery pack, in addition to the battery cell or the battery module mentioned above, and the number of venting devices 100 or 200 to be attached may be appropriately selected as needed.

In addition, two venting devices 100 and 200 having different operating mechanisms may be simultaneously attached to one battery product.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

100, 200: Venting devices
110, 210: Gas inlets
120, 220: Gas outlets
130, 230: Sealing caps
231: Main body portion
232: Recessed portion
140, 240: Connection portions
141: Protrusion
241: Heat shrink tube
150, 250: Alarm means

The invention claimed is:

1. A venting device configured to discharge gas in a battery cell or a battery module to an outside, comprising:
   a gas inlet configured to allow gas in the battery cell or the battery module to be introduced therethrough;
   a gas outlet configured to allow the gas introduced through the gas inlet to be discharged to the outside therethrough;
   an alarm provided at one side of the gas outlet, the alarm being configured to generate a sound when the gas is discharged to the outside;
   a connection portion configured to connect the gas inlet and the gas outlet to each other; and

7 a sealing cap located in the connection portion, the sealing cap being configured to move to discharge gas to the outside, wherein the sealing cap blocks connection between the gas inlet and the gas outlet, thereby blocking discharge of gas and introduction of external air, in a normal state, and moves in the connection portion under a predetermined condition such that the gas inlet and the gas outlet are connected to each other, and wherein the connection portion is made of a heat shrink tube configured to shrink at a temperature of the gas in the battery cell to move the sealing cap such that the gas inlet and the gas outlet are connected to each other.

2. The venting device according to claim 1, wherein, when a pressure of gas in the battery cell or the battery module is increased to a predetermined level or higher, the sealing cap moves in the connection portion such that the gas inlet and the gas outlet are connected to each other.

3. The venting device according to claim 1, wherein, when an internal temperature is increased to a predetermined level or higher, the sealing cap is configured to move in the connection portion through contact with the heat shrink tube such that the gas inlet and the gas outlet are connected to each other.

4. The venting device according to claim 1, wherein the heat shrink tube is formed from polyethylene (PE) and polypropylene (PP).

5. The venting device according to claim 1, wherein the heat shrink tube is formed from silicone.

6. The venting device according to claim 1, wherein the heat shrink tube is formed from polyethylene terephthalate (PET).

7. The venting device according to claim 1, wherein the sealing cap comprises a main body portion and an internal recess located within the main body portion such that a part of the main body portion is configured to be compressed when the heat shrink tube shrinks.

8. The venting device according to claim 1, wherein a lower part of the heat shrink tube thermally shrinks at a lower temperature than an upper part of the heat shrink tube.

9. The venting device according to claim 1, wherein the connection portion has a lower portion having a decreasing width and an upper portion having a constant width, and wherein the sealing cap has a constant width.

10. The venting device according to claim 1, wherein the gas inlet connects to the connection portion at a first point, wherein the gas outlet connects to the connection portion at a second point, and wherein a bottom surface of the sealing cap rises above the second point so that the gas inlet and the gas outlet are connected to each other.

11. The venting device according to claim 1, further comprising a protrusion configured to space a lower surface of the sealing cap and a bottom surface of the connection portion from each other.

12. A battery cell having the venting device according to claim 1.

13. A battery module having the venting device according to claim 1.

14. A venting device configured to discharge gas in a battery cell or a battery module to an outside, comprising:

a gas inlet configured to allow gas in the battery cell or the battery module to be introduced therethrough;

a gas outlet configured to allow the gas introduced through the gas inlet to be discharged to the outside therethrough;

an alarm provided at one side of the gas outlet, the alarm being configured to generate a sound when the gas is discharged to the outside;

a connection portion configured to connect the gas inlet and the gas outlet to each other; and a sealing cap located in the connection portion, the sealing cap being configured to move to discharge gas to the outside, wherein the sealing cap blocks connection between the gas inlet and the gas outlet, thereby blocking discharge of gas and introduction of external air, in a normal state, and moves in the connection portion under a predetermined condition such that the gas inlet and the gas outlet are connected to each other, wherein the connection portion is made of a heat shrink tube configured to shrink at a predetermined temperature or higher, and wherein a lower part of the heat shrink tube thermally shrinks at a lower temperature than an upper part of the heat shrink tube.

* * * * *